United States Patent
Nir et al.

(10) Patent No.: US 12,222,974 B2
(45) Date of Patent: Feb. 11, 2025

(54) ONTOLOGY CUSTOMIZATION FOR INDEXING DIGITAL CONTENT

(71) Applicant: Microsoft Technology Licensing, LLC, Redmond, WA (US)

(72) Inventors: Oron Nir, Herzeliya (IL); Inbal Sagiv, Kfar Saba (IL); Fardau Van Neerden, Driel (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/853,086

(22) Filed: Jun. 29, 2022

(65) Prior Publication Data

US 2024/0004915 A1  Jan. 4, 2024

(51) Int. Cl.
*G06F 16/36* (2019.01)
*G06F 16/35* (2019.01)
(Continued)

(52) U.S. Cl.
CPC ............ *G06F 16/367* (2019.01); *G06F 16/35* (2019.01); *G06F 18/21375* (2023.01);
(Continued)

(58) Field of Classification Search
CPC .. G06F 16/367; G06F 16/35; G06F 18/21375; G06F 18/22; G06F 18/2323; G06F 40/30
See application file for complete search history.

(56) References Cited

U.S. PATENT DOCUMENTS

| | | |
|---|---|---|
| 8,326,842 B2 | 12/2012 | Vadlamani |
| 10,560,734 B2 | 2/2020 | Jassin et al. |

(Continued)

FOREIGN PATENT DOCUMENTS

CN    115390066 A  *  11/2022

OTHER PUBLICATIONS

Nir, et al., "CAST: Character labeling in Animation using Self-supervision by Tracking", in Repository of arXiv:2201.07619v1, Jan. 19, 2022, 19 Pages.

(Continued)

*Primary Examiner* — Mark D Featherstone
*Assistant Examiner* — Kweku William Halm
(74) *Attorney, Agent, or Firm* — Holzer Patel Drennan

(57) ABSTRACT

A method for automatically classifying terms of a first ontology into categories of a classification scheme defined with respect to a second ontology includes generating, for each term in the first ontology and each term in the second ontology, an embedding encoding the term and a description of the term. The method further includes adding the generated embeddings to a transformer model and computing, for each pair of the embeddings consisting of a first term from the first ontology and a second term from the second ontology, a similarity metric quantifying a similarity of the first term and the second term. The method still further provides for determining a matching scheme based on the similarity metric computed with respect to each pair of the embeddings, where the matching scheme associates term of the first ontology with one or more relevant categories of the classification scheme defined with respect to the second ontology. The method further provides for returning the one or more relevant categories of the classification scheme that are matched, by the determined matching scheme, to a term of the second ontology received as an input.

20 Claims, 6 Drawing Sheets

(51) Int. Cl.
  *G06F 18/2137* (2023.01)
  *G06F 18/22* (2023.01)
  *G06F 18/2323* (2023.01)
  *G06F 40/30* (2020.01)

(52) U.S. Cl.
  CPC .......... *G06F 18/22* (2023.01); *G06F 18/2323* (2023.01); *G06F 40/30* (2020.01)

(56) References Cited

U.S. PATENT DOCUMENTS

| | | | |
|---|---|---|---|
| 10,936,630 | B2 | 3/2021 | Ronen et al. |
| 10,963,501 | B1 | 3/2021 | Ramachandrappa |
| 11,386,095 | B2 | 7/2022 | Ali |
| 2015/0106078 | A1* | 4/2015 | Chang .................... G06F 16/35 704/9 |
| 2015/0286713 | A1* | 10/2015 | Zhang ................... G06F 16/367 707/749 |
| 2017/0109373 | A1 | 4/2017 | Sung |
| 2018/0357259 | A1 | 12/2018 | Jin |
| 2021/0081699 | A1 | 3/2021 | Ronen et al. |
| 2021/0295822 | A1* | 9/2021 | Tomkins ............. G06F 16/3329 |
| 2021/0312304 | A1 | 10/2021 | Keena |
| 2021/0350915 | A1 | 11/2021 | Letinic |
| 2022/0005463 | A1* | 1/2022 | Bender ............... G06F 16/3347 |
| 2024/0005094 | A1 | 1/2024 | Nir |

OTHER PUBLICATIONS

"International Search Report and Written Opinion Issued in PCT Application No. PCT/US23/022472", Mailed Date: Aug. 10, 2023, 12 Pages.

"International Search Report and Written Opinion Issued in PCT Application No. PCT/US23/022613", Mailed Date: Aug. 7, 2023, 13 Pages.

Song, et al., "Multi-Domain Ontology Mapping Based on Semantics", In the Journal of Cluster Computing, vol. 20, Issue 4, Aug. 8, 2017, pp. 3379-3391.

U.S. Appl. No. 17/853,310, filed Feb. 10, 2024.

Non-Final Office Action mailed on May 23, 2024, in U.S. Appl. No. 17/853,310 10 pages.

Notice of Allowance mailed on Sep. 25, 2024, in U.S. Appl. No. 17/853,310, 8 pages.

* cited by examiner

ONTOLOGY CUSTOMIZATION FOR INDEXING DIGITAL CONTENT

BACKGROUND

Natural Language Processing (NLP) is a form of artificial intelligence that gives machines the ability to "understand" aspects of written language, such as by measuring semantic similarities to decipher contextual nuances. NLP models typically embed terms as vectors in high dimensional space with distances between each pair of vectors correlating with a learned degree of semantic similarity of the two corresponding terms. Each NLP model may be understood as being built or trained to understand a single primary ontology. For example, an ontology may be a collection of medical texts, a database of entertainment media content, or even the collection of webpages available at Wikipedia.org.

SUMMARY

According to one implementation, a method for ontology matching includes generating embeddings that encode terms of a first ontology and a second ontology in high dimensional vector space. Each embedding encodes a single one of the terms and a description of the term. The generated embeddings are added to a transformer model. For each pair of the embeddings consisting of a first term from the first ontology and a second term from the second ontology, a similarity metric is computed. A matching scheme is then determined based on the computed similarity metrics across many pairs of the embeddings to associate each term of the second ontology with one or more relevant categories of a categorization scheme that has been previously used to classify the terms of the first ontology. The method further provides for receiving a term of the second ontology and, in response, identifying and returning one or more relevant categories associated with the received term within the determined matching scheme.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
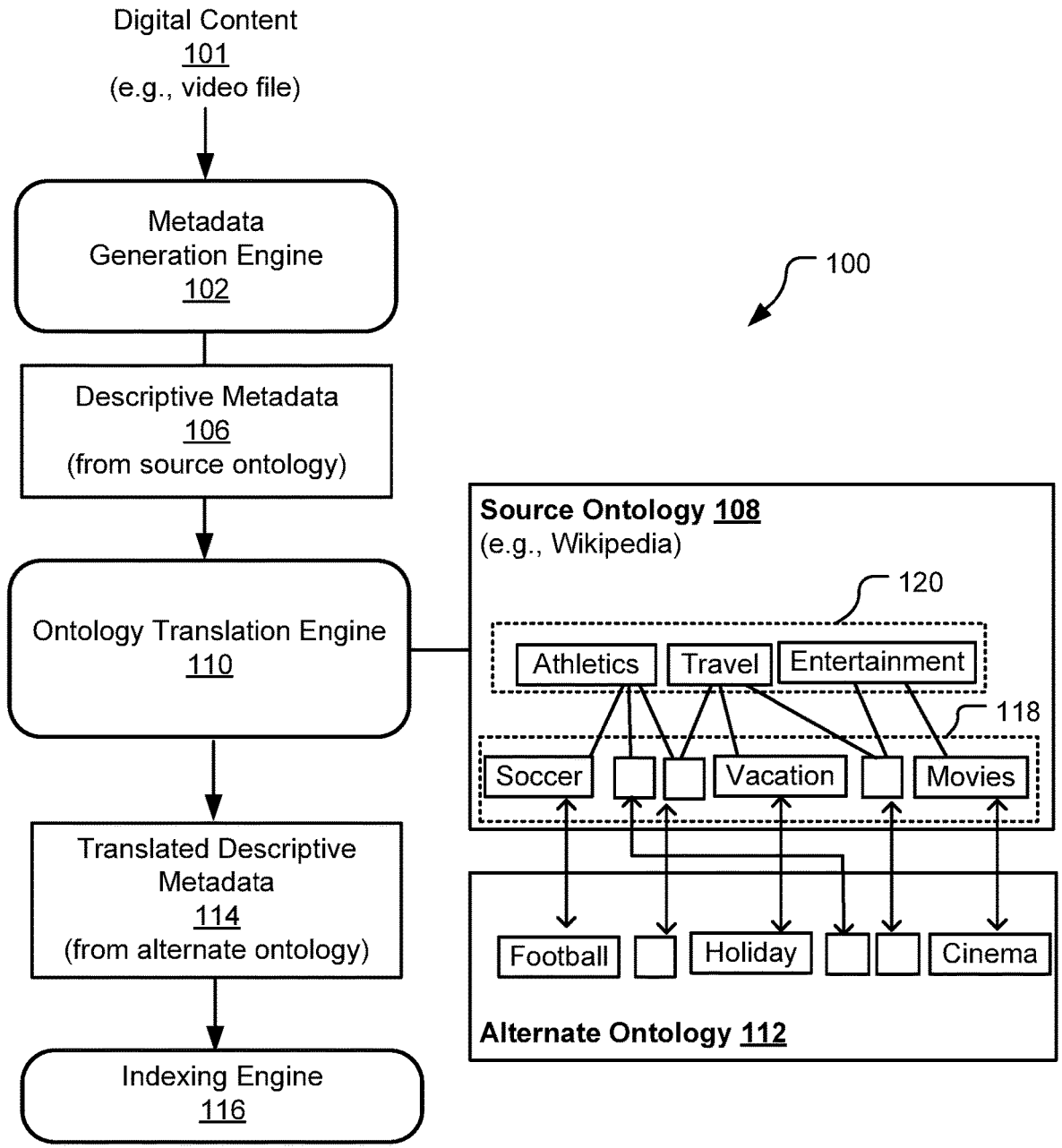
FIG. 1 illustrates an example system that includes an ontology translation engine that receives as input terms of a first ontology and that performs ontology matching operations.

An ontology is a set of concepts and categories in a subject area or domain that shows their properties and the relations between them. Ontology Matching (OM) constitutes the task of establishing correspondences between semantically related identities from different ontologies. Ontology matching may have applicability in a variety of fields; however, one salient example is metadata generation for digital content indexing. Various service providers may provide digital content indexing services that utilize NLP models to generate metadata, such as relevant keywords and categories, to help make digital content (e.g., images, text files, audio, video) more searchable. For example, a digital content indexing service may use a metadata generation engine that receives inputs such as keywords parsed from a title of a media file, from an audio transcript, or generated by facial recognition and optical character recognition (OCR) software. In response to receipt of such inputs, the metadata generation engine may leverage learned semantic associations of an NLP model to generate additional metadata (tags and categories) that can be appended to the digital content to make it more searchable when stored in a database.

Although a number of tools that generate metadata (e.g., keywords) for indexing digital content exist, these tools are typically designed to utilize a specific ontology of terms. Some digital content owners may prefer to index their digital content with keywords from an ontology that is different from the ontologies used by these available tools.

For example, the media domain has multiple media standards such as terms commonly used by the International Press and Telecommunications Counsel (IPTC) and the international advertising bureau (IAB) that may be used to tag media/advertisement content for video categorization and indexing purposes. Certain enterprises may wish to index digital content with these ontologies or others, such as proprietary ontologies. As there is no one centralized ontology to generalize across all domains, there exist applications that could benefit from an artificial intelligence (AI) platform that performs ontology matching.

The herein disclosed technology uses machine learning (ML) techniques to facilitate ontology matching with respect to terms of any two flat (non-hierarchical) ontologies such that any term within a first one of the ontologies can be readily mapped to a most semantically similar term of the other ontology. In one implementation, the terms of the first ontology have been pre-classified into different categories using a select categorization scheme. An ontology translation engine receives terms of a second ontology, performs ontology matching to identify semantically similar (e.g., best matching) terms from the first ontology and, based on this, sorts the received terms of the second ontology into most relevant existing categories of the categorization scheme used to categorize the terms of the first ontology. In this sense, terms of the second ontology can be automatically categorized (e.g., for indexing purposes or otherwise)

into categories of a categorization scheme that was originally developed with respect to the first ontology.

By example, an encyclopedia (e.g., Wikipedia®, which is an online encyclopedia that includes approximately 8 million different webpages each describing a different term) may be understood as a first ontology. Many encyclopedias, including Wikipedia®, also use a categorization scheme to index terms. For example, the bottom of each Wikipedia® term webpage indicates a list of "categories" with which the term is associated. Using the herein disclosed techniques, a trained ML model can receive a set of terms of a second ontology (e.g., a proprietary ontology with a few thousand terms) and perform ontology matching to identify, for each received term, a best-match term from the first ontology (e.g., the most semantically similar term that has a Wikipedia® webpage) and/or a list of the most relevant categories for the term that exist within the categorization scheme of the first ontology (e.g., the most relevant Wikipedia® categories).

In one implementation, an ontology translation engine disclosed herein is implemented as an "add-on" to an existing metadata generation engine—or other software tool—that uses an NLP model to identify and output terms that are defined within a first ontology. The ontology translation engine receives the output terms of the first ontology and matches each received term with a term of a second ontology that is most similar semantically. In some implementations, the ontology translation engine further sorts the terms of the second ontology into categories of a categorization scheme that is used to index terms of the first ontology.

Lacking the herein disclosed techniques, ontology matching is a manual and somewhat subjective task. Existing NLP tools are designed to use singular ontologies with hundreds of thousands or millions of terms. As such, it is currently cost-prohibitive for web-based services to provide ontology translation services. The disclosed techniques facilitate automated wide-scale adaptation of NLP-based services tools for multi-ontology compatibility.

FIG. 1 illustrates an example system 100 that includes an ontology translation engine 110 that receives as input terms of a first ontology (e.g., a source ontology 108) and that performs ontology matching to identify, for each term, a most semantically-similar term of a second ontology (e.g., an alternate ontology 112) and/or relevant categor(ies) used with respect to the first ontology.

Although the ontology translation engine 110 may be used in a variety of different systems for different purposes, one relevant use case illustrated by FIG. 1 is digital content indexing. In a variety of scenarios, content owners utilize keywords, such as categories, to index digital content to make it more searchable, such as to facilitate keyword or category-based queries to databases of video files, audio files, images, executable, text, and other content. These generated keywords and categories are collectively referred to herein as "descriptive metadata," which may be understood as generated content that is appended to or otherwise associated with source content for indexing purposes.

In FIG. 1, a metadata generation engine 102 is an example of a publicly available tool that analyzes digital content to generate descriptive metadata 106. The descriptive metadata 106 includes terms selected from a first ontology, referred to herein as the source ontology 108, for which the metadata generation engine 102 was initially designed. Certain users of the metadata generation engine 102 may prefer to index their digital content with terms selected from a second ontology (the alternate ontology 112) with which the metadata generation engine 102 is unfamiliar. This ontology matching is facilitated by the ontology translation engine 110, which is described below and with respect to the other figures herein.

In one implementation, the metadata generation engine 102 extracts information from digital content 101 (e.g., a title, description, audio transcript, text identified from OCR software, faces identified from facial recognition software) and identifies terms in the source ontology 108 that are semantically related to the extracted information. These related terms are output as the descriptive metadata 106. For example, the digital content 101 may be an image, an audiobook, text file, video, sound clip, individual video frame, or executable content (e.g., a video game), and the output descriptive metadata 106 may include keywords (tags), categories, or other information that is descriptive of the digital content 101.

In various implementations, the metadata generation engine 102 may generate the descriptive metadata 106 in different ways. In one implementation, the metadata generation engine 102 applies static rules and constraints to identify and output relative terms of the source ontology 108. In another implementation, the metadata generation engine 102 includes one or more trained ML models that execute ML logic to generate the descriptive metadata 106. For example, the metadata generation engine 102 may include a trained natural language processing (NLP) model (not shown) that encodes terms of the source ontology 108 as vectors in higher-dimensional space (e.g., tens or hundreds of dimensions) with mathematical distances between pairs of vectors correlating with a learned degree of semantic similarity of the corresponding terms. Examples of NLP models of this type include sequence-to-sequence (Seq2Seq) models or transformer models, such as BERT (Bidirectional Encoder Representations from Transformers).

Regardless of the specific method(s) employed to generate the descriptive metadata 106, the terms in the descriptive metadata 106 are to be understood as terms that are defined within the source ontology 108. The ontology translation engine 110 receives the descriptive metadata 106 output by the metadata generation engine 102 and translates the term (s) of the source ontology 108 to an identified "most-similar" term in an alternate ontology 112.

In one implementation, the ontology translation engine 110 references a pre-derived matching scheme to translate each term of the descriptive metadata 106 of the source ontology 108 to a corresponding most semantically similar term of the alternate ontology 112. The identified, most semantically similar terms are output by the ontology translation engine 110 as translated descriptive metadata 114. In one implementation, the matching scheme of the ontology translation engine 110 leverages a transformer-based NLP model that encodes each term of the two ontologies in a high-dimensional vector space. A similarity metric is computed with respect to each cross-ontology pair of terms, and a stable matching scheme is automatically derived based on the collection of computed similarity metrics, such as is described in further detail with respect to FIG. 2-5.

In the system 100, the translated descriptive metadata 114 is provided to an indexing engine 116 that indexes the digital content 101 in a database in association with the translated descriptive metadata 114 such that the terms within the translated descriptive metadata 114 can be used as keywords in a search engine query to identify the digital content 101 within a database.

In one implementation, the source ontology 108 categorizes each of its terms per a defined categorization scheme.

For example, the source ontology 108 shows example categories 120 into which various terms 118 are sorted. In one implementation, the ontology translation engine 110 receives terms (e.g., such as the terms 118) that are of the source ontology 108 (e.g., terms extracted from or generated based on the digital content file), translates those terms into best match terms of the alternate ontology 112, and further categorizes the terms of the second ontology into the categories 120 of the categorization scheme used by the source ontology 108. The ontology translation engine 110 then outputs the alternate (translated) terms as well as the identified relevant categories for those terms. In another implementation, the ontology translation engine 110 performs the reverse operations and receives terms from the alternate ontology 112, translates those terms to best match terms of the source ontology 108, and outputs the translated terms and/or the categories pre-associated with the translated terms in the source ontology 108.

In still another implementation, the ontology translation engine 110 does not perform any categorization of the translated terms. All of the implementations are consistent with the logical mechanisms described in further detail with respect to the following figures.

Notably, indexing digital content is just one of many potential applications for the ontology translation engine 110. The ability to translate term(s) in a first ontology to a corresponding "best match" term in a second ontology may also facilitate low-effort modification of a variety of existing NLP tools to facilitate applications of those tools for an ontology that is different than the ontology the tool(s) were initially designed to utilize. For example, the ontology translation engine 110 essentially repurposes the metadata generation engine 102 to facilitate generation of metadata terms of the alternate ontology 112 and/or to categorize those metadata terms to thereby generate richer (e.g., more searchable) descriptive metadata as described above without modifying code within the metadata generation engine 102.

Figure 2:
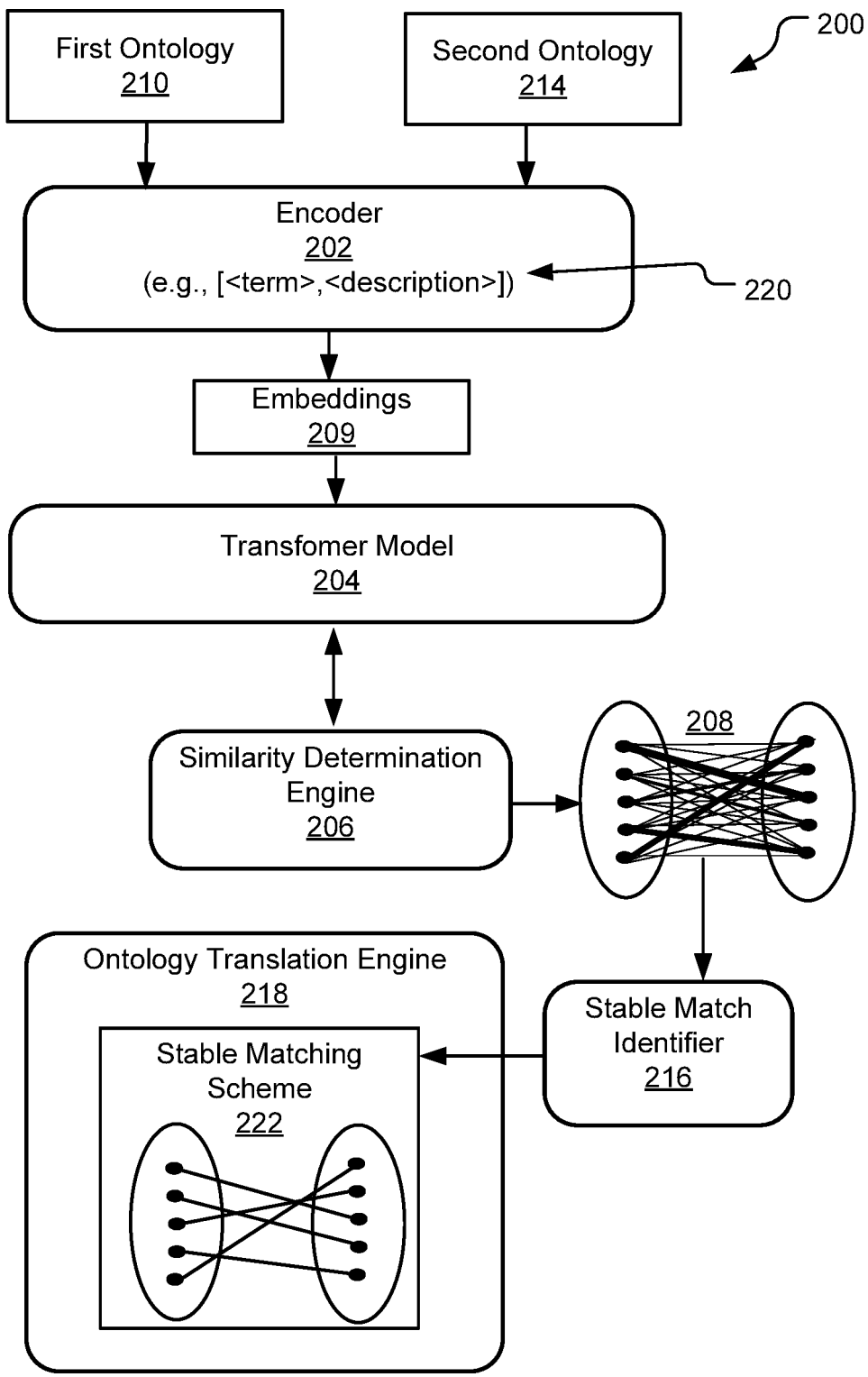
FIG. 2 illustrates example aspects of a system used to derive an ontology matching scheme that is usable to translate a term defined within a first ontology to a semantically most-similar term in a second ontology.

FIG. 2 illustrates example aspects of a system 200 used to derive an ontology matching scheme that is usable to translate a term defined within a first ontology 212 to a semantically most-similar term in a second ontology 214. The system 200 includes a transformer model 204, which is defined herein to be either a true transformer model or a transformer-based model (such as a model that relies on Bidirectional Encoder Representations from Transformers (BERT)).

The transformer model 204 makes use of "Transformer," an attention mechanism that learns relations between words or sub-words in a text. Transformer works by performing a small, consistent number of steps. In each step, it applies an attention mechanism to understand relations between all words in a sentence, regardless of their respective position. Logic of a basic Transformer receives input from an encoder 202 (which may be an external body or a part of the transformer model) to read the text input and a decoder to produce a prediction for the task. As the goal of BERT models is to generate a language representation model, BERT models do not include the decoder that is included in other types of transformer models. In one implementation, the input to the encoder 202 of the transformer model 204 is a sequence of tokens which are converted into vectors (embeddings 209) by the encoder 202 and then processed in the neural network of the transformer model 204.

Regardless of the type of transformer model 204 employed within the system 200, the transformer model 204 represents each of the terms as an embedding (e.g., a high dimensional vector) within a vector space where the distance between embeddings correlates with similarity between the associated terms. In the example of FIG. 2, the sequence of tokens provided, for example, include the sequence input 220 of the form "<term><description>", where "term" is a text string of the term itself and description is a text-based description of the term, such as a dictionary definition, encyclopedia article, or other descriptive text block. The encoder 202 transforms the sequence input 220 into one or more multidimensional embeddings that may, for example, have thousands of dimensions in a manner such that the physical distance between different embeddings is correlates with the similarity of their corresponding terms. Some transformer language models encode each term as a single high dimensional vector (e.g., a Word embedding), while others—such as BERT—embed each term as multiple different high dimensional vectors that may be combined, concatenated, or used in the alternative (depending on the application), to facilitate a dot product or cosine similarity comparison of a pair of terms. For example, some versions of BERT used embeddings of a classification token (the CLS token) as the representation for classification tasks.

A similarity determination engine 206 computes a similarity metric for each unique pair of terms that includes a first term from the first ontology 210 and a second term from the second ontology 214 ("a cross-ontology pair"). The similarity metric is, for example, a dot product or cosine similarity. In one implementation, generating the similarity metric for each cross-ontology pair includes generating a bipartite graph 208 with a first set of nodes corresponding to terms of the first ontology 210, a second set of nodes corresponding to terms of the second ontology 214, and edges connecting each node of the first set to each node of the second set. The edges are defined by an associated weight that represents the computed degree of similarity between the embeddings corresponding to the endpoint nodes of the edge that are associated with the two different ontologies.

In one implementation, the similarity determination engine 206 computes a similarity metric with respect to every edge in the bipartite graph 208 (e.g., for unique pair of nodes spanning the two ontologies). At this point, the computed edge weights can be used to readily identify which terms are more similar and which terms are less similar; however, there is no clear 1-to-1 matching scheme usable to facilitate ontology translation. For example, a first term in the first ontology may be strongly correlated with many terms in the second ontology and those terms may, in fact, have even stronger match(es) with other terms of the first ontology than to the first term.

To facilitate ontology matching (a 1-to-1 translation between terms), a stable match identifier 216 employs a suitable algorithm to identify, from the computed similarity metrics (e.g., edge weights in a bipartite graph) a stable matching scheme 222. As used herein, a true stable matching scheme refers to a 1-to-1 matching that exists when there is no pair of nodes more similar to one another than to their respective matched partner nodes and no node that is more similar to an unmatched node than to its own matched node.

Notably, there may exist scenarios where the first ontology 210 and the second ontology 214 are of different sizes, in which case, a stable matching scheme may leave some nodes without matched partners. In some applications that rely on bidirectional ontology translation capability, the stable match identifier 216 may perform some relaxation of constraints to provide matchings for those remaining unmatched terms in the larger one of the two ontologies. Notably, the term "stable matching scheme" is used herein to refer to a matching scheme that is either a true stable matching scheme (e.g., 1-to-1 with some terms unmatched when the ontologies are different sizes) or a matching scheme that includes some terms mapped 1-to-many (e.g., to ensure ontology translation can be performed bidirectionally when one ontology is larger than the other). In either of these cases, however, the stable matching scheme 222 does not include any pair of nodes that are more similar to one another than to their respective matched partner nodes and does not include any node that is more similar to an unmatched node that to its own matched node One suitable algorithm for identifying the stable matching scheme is known as the Stable Marriage algorithm. Another suitable algorithm is known as the Hungarian matching algorithm. If the ontologies are different sizes, such an algorithm may be administered by first adding in dummy nodes to even out the sizes of the two ontologies. The algorithm is employed to identify a true stable matching, and then the similarity determination engine 206 drops the dummy nodes to isolate their partners and re-matches those isolated nodes with their next best match in the bipartite graph to derive the stable matching scheme 222, which may be used by an ontology translation engine 218 to facilitate ontology matching consistent with other description included herein.

In some implementations, the ontology translation engine 218 performs actions for categorizing terms of the second ontology 214 according to a categorization scheme that is used to sort terms of the first ontology 210. Specific actions facilitating such categorization are defined in greater detail with respect to FIGS. 3A and 3B below.

Figure 3A:
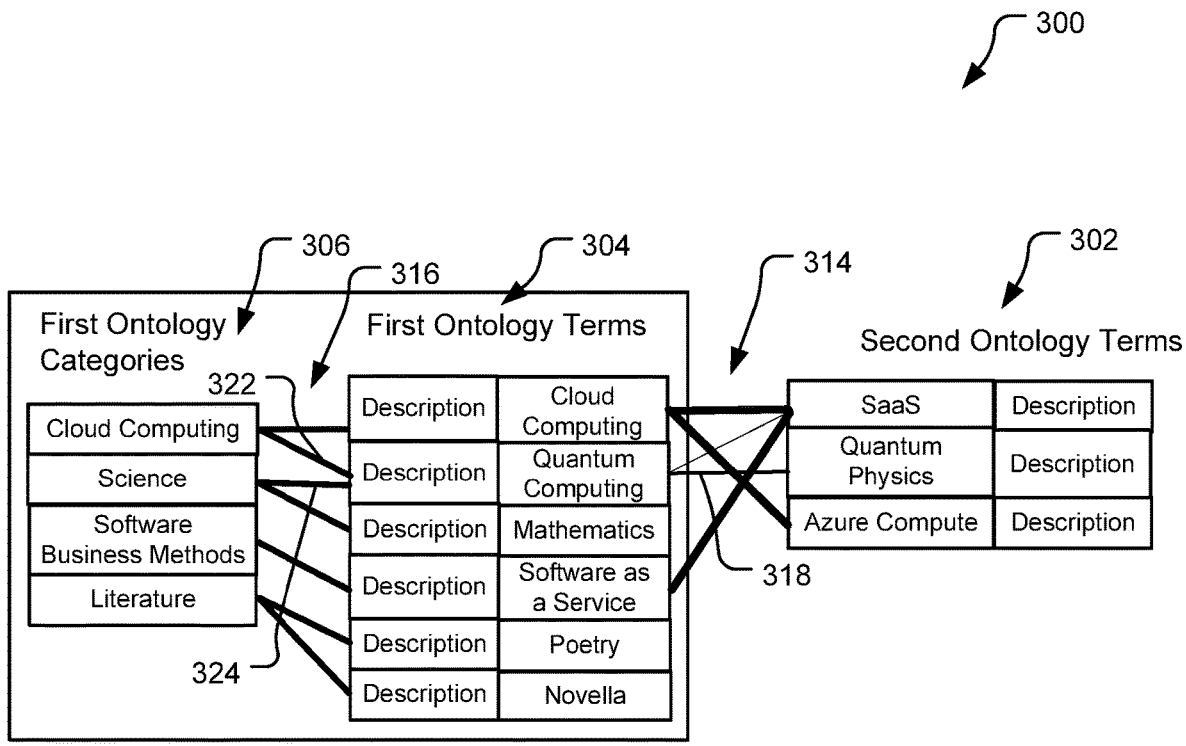
FIG. 3A illustrates example actions for ontology matching performed with respect to a graph including a first set of nodes corresponding to terms of a first ontology, a second set of nodes corresponding to terms of a second ontology, and a set of edges extending between select nodes of the first ontology and of the second ontology.
Figure 3B:
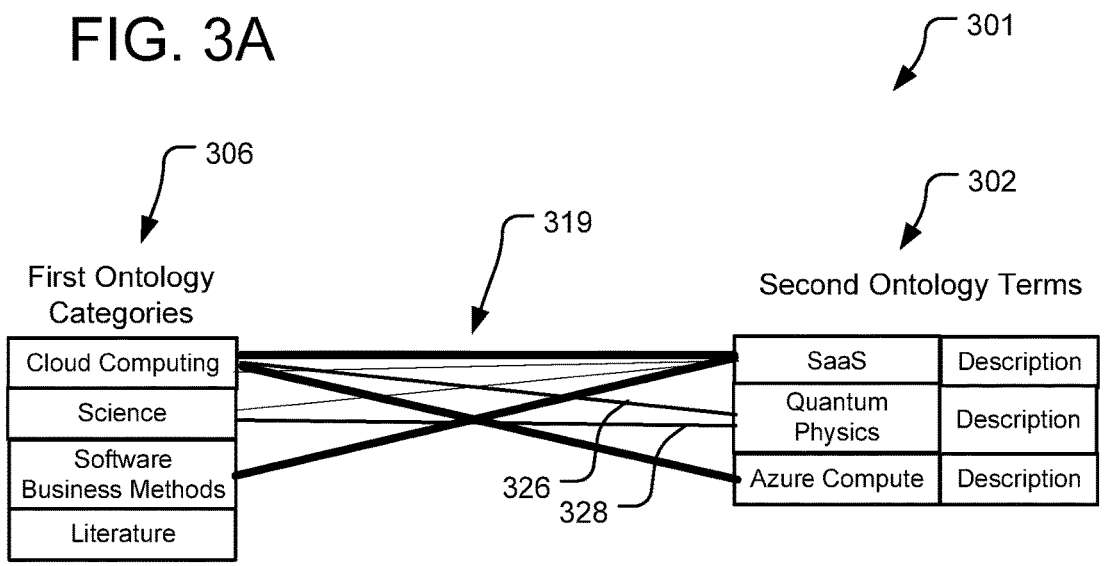
FIG. 3B illustrates a modified graph that reflects additional example actions for ontology matching following the actions described with respect to FIG. 3A.

FIG. 3A-3B illustrate actions for categorizing terms of a second ontology 302 into categories 306 of a categorization scheme that was previously designed for and used to categorize terms of a first ontology 304. According to one implementation, the actions described below with respect to FIG. 3A are performed by a similarity determination engine with characteristics the same or similar to the similarity determination engine 206 of FIG. 2. According to another implementation, the actions described below with respect to FIG. 3B are performed by a stable match identifier such as the stable match identifier 216 of FIG. 2.

FIG. 3A illustrates example actions for ontology matching performed with respect to a graph 300 including a first set of nodes corresponding to terms of a first ontology 304, a second set of nodes corresponding to terms of a second ontology 302 and a set of edges 314 extending between select nodes of the first ontology 304 and of the second ontology 302.

The graph 300 further includes a third set of nodes corresponding to the categories 306 within a classification scheme used to categorize the terms of the first ontology 304. The terms of the first ontology 304 are each connected to one or more of the categories 306 by another set of edges 316 indicative of these existing classifications.

In the graph 300 of FIG. 3A, the terms shown with respect to the first ontology 304 and the second ontology 302 are represented as embeddings within a natural language model (e.g., transformer model) where distances between pairs of embeddings can be readily computed (e.g., by taking dot product or cosine similarity) and where such distance is indicative of the semantic similarity of the corresponding terms.

According to one implementation, the edges between the terms of the first ontology 304 and the terms of the second ontology 302 are generated by computing a similarity metric for each unique pair of cross-ontology terms (including one term from each of the two ontologies). The similarity metric is also referred to as an edge weight and may be understood as a metric that quantifies a strength of similarity of the endpoints on a corresponding one of the edges 314, where the endpoints of the edge are embeddings a transformer model, as described elsewhere herein.

In one implementation, the matching techniques discussed above with respect to FIG. 2A are used to identify a single correlation between each term of the first ontology 304 and of term of the second ontology 302 (e.g., a "best match" term that pairs each term with a matching term in the other ontology). This may, for example, be achieved by suitable matching optimization, such as via a stable marriage algorithm or Hungarian matching algorithm followed by a relaxation of constraints to ensure that ultimately, each term of the second ontology 302 is matched to a single (identified "best match") term within the first ontology 304. The edges 314 representing these best matches are then extended to connect with corresponding edges of the edges 316, thereby matching each term of the second ontology 302 with the one or more categories that are pre-associated with the corresponding best match term of the first ontology 304.

While the above discussion highlights one suitable matching technique, FIG. 3A illustrates an alternate methodology that may provide for a more accurate matching of the categories 306 to the terms of the second ontology 302.

According to one implementation, the graph 300 is constructed by computing a similarity metric between each pair of unique terms including a first term selected from first ontology 304 and a second term selected from the second ontology 302. This similarity metric is assigned, as the edge weight, for a corresponding edge in the graph 300. Following this, a subset of the edges 314 with an edge weight below a threshold are dropped from consideration, meaning that the bulk of the ontology matching and categorization is performed with respect to an identified subset of edges indicative of a sufficiently high (per the threshold) similarity between the terms corresponding to the endpoint nodes of the edge. For example, all matches with a threshold similarity (e.g., cosign similarity) greater than 95% may be accepted while all other edges are dropped. In other implementations, this threshold similarity for acceptance may be higher or lower.

In FIG. 3A, example weights of the edges 314 are conveyed by line thickness where a thicker line represents a stronger similarity between endpoints and a thinner line represents a weaker similarity between endpoints. For example, "SaaS" (software as a service) may be characterized by a threshold or greater similarity to both "cloud computing" and "quantum computing," but SaaS is more similar to cloud computing than to quantum computing.

FIG. 3B illustrates a modified graph 301 that reflects additional example actions for ontology matching following the actions described above with respect to FIG. 3A. Specifically, the graph 300 of FIG. 3A has been modified to remove the central set of nodes (e.g., corresponding to the terms of the first ontology 304), and the edges 314 have been extended to interconnect with corresponding ones of the edges 316 such that there exists a set of paths 319 connecting the terms of the second ontology 302 to select corresponding categories selected from the categories 306.

For example, in the graph 300 of FIG. 3A, "quantum physics" is connected by an edge 318 to "quantum computing" which is, in turn, connected by an edge 322 to "cloud computing" and by another edge 324 to "science." In the modified graph 301 of FIG. 3B, this set of edges has been replaced with two paths. A first path 326 has been formed by combining the edge 318 with the edge 322 and a second path 328 has been formed by combining the edge 318 with the edge 324. Each of the first path 326 and the second path 328 is assigned a path weight that is based on the similarity metric computed with respect to the incorporated edge of the edges 314. In this case, the edge 318 is incorporated into both of paths 326 and 328; thus, the paths 326 and 328 each have a path weight identical to the edge 318. In this sense, the similarity metric computed with respect to each term of the second ontology and a corresponding term of the first ontology is used to quantify a strength of association between the term of the second ontology and at least one of the categories classifying the corresponding term of the first ontology.

Although not shown, there may exist some different paths in the graph 300 of FIG. 3A with the same endpoints (e.g., paths extending from a term of the second ontology 302 to one of the categories 306) that are combined into a single path in the modified graph 301. For example, two paths may originate at a same term in the second ontology 302, intersect two different terms in the first ontology 304, and yet terminate at a same one of the categories 306. Paths such as these that extend between a same one of the terms of the second ontology 302 and a same one of the categories 306 are merged together in the graph 301 and assigned an adjusted path weight, such as by considering the median Cosine similarity score or other suitable technique.

To meaningfully further reduce the number of the categories 306 associated with each of the terms of the second ontology 302, an optimization-based matching algorithm may be employed on the modified graph 301 (e.g., the stable matching algorithm) followed by a relaxation of constraints to ensure each term of the second ontology 302 is matched to at least one of the categories 306. Performing the stable matching with respect to the paths 319 and corresponding path weights rather than with respect to the edges 314 and corresponding edge weights shown in FIG. 3A allows for identification of a "best" matching category for each term of the second ontology 302 because it inherently relies on merged/aggregated paths with shared endpoints, as described above.

In one implementation, the final stable matching scheme resulting from the actions described above with respect to FIGS. 3A and 3B is used by an ontology translation engine, such as the ontology translation engine 110 of FIG. 1 or 218 of FIG. 2, to perform automated ontology matching.

Figure 4:
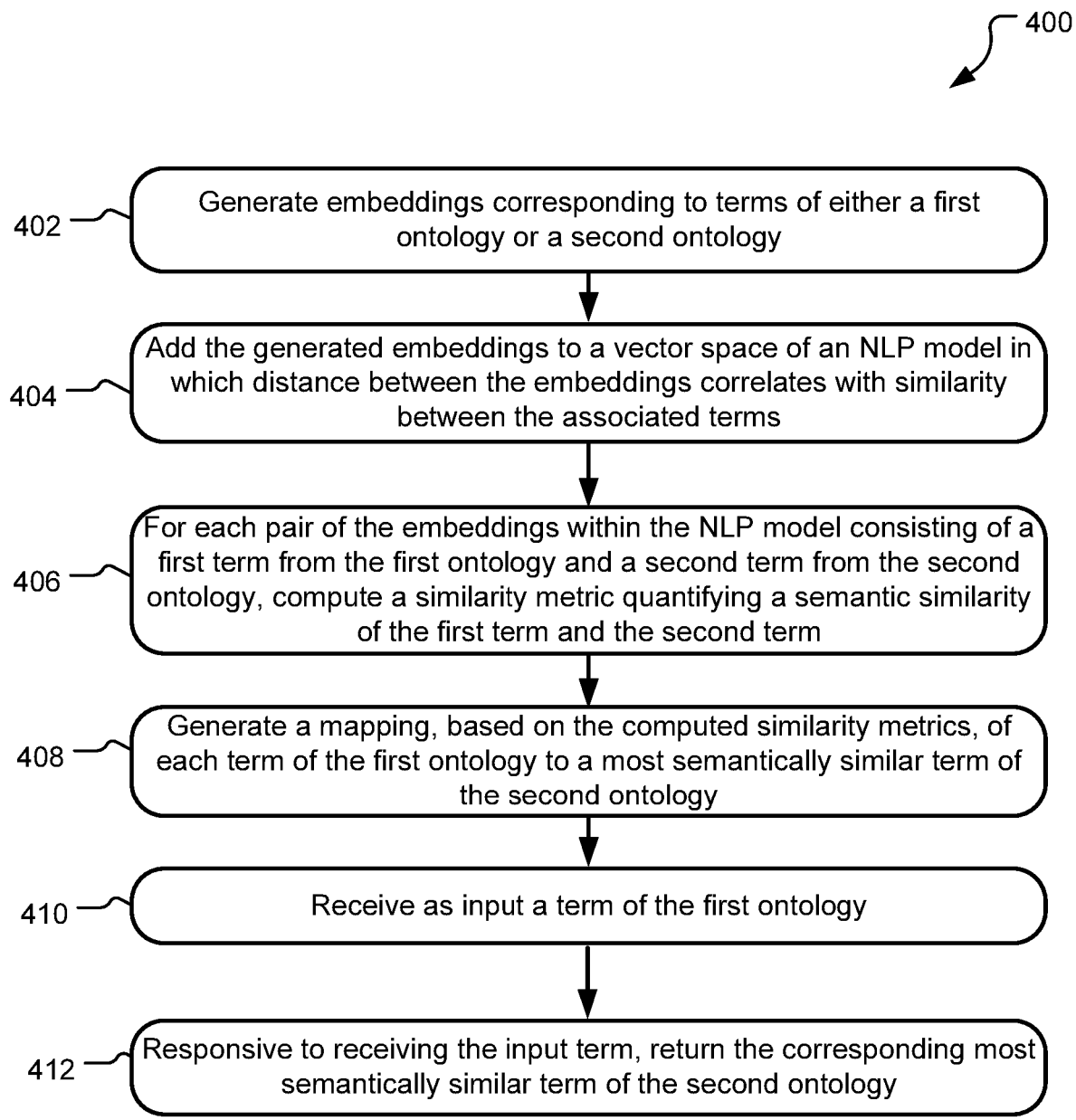
FIG. 4 illustrates further example operations for ontology matching.

FIG. 4 illustrates example operations 400 for ontology matching. An embedding generation operation 402 generates (e.g., by an encoder) embeddings that correspond to different terms selected from either a first ontology or a second ontology. Each of the embeddings encodes a one of the terms and a description of the term. In one implementation, the embedding generation operation 402 generates an embedding for each term of the first ontology and the second ontology. In another implementation, the embedding generation operation 402 generates embeddings for a subset of the terms from the first ontology and/or the second ontology that are not yet represented within a vector space of a NLP model that is used (by subsequent operations of FIG. 4) to perform an ontology translation operation. If, for example, the NLP model already includes embeddings corresponding to all terms of the first ontology, the embedding generation operation entails generating embeddings for the terms of the second ontology.

A model update operation 404 adds the generated embeddings to a vector space of an NLP model. Within the vector space, distance between the embeddings correlates with a degree of learned similarity between the associated terms. Following the model update operation 404, it is assumed that the NLP model includes an embedding corresponding to each term of the first ontology and each term of the second ontology.

A similarity assessment operation 406 computes a similarity metric for each pair of the embeddings consisting of a first term from the first ontology and a second term from the second ontology. The similarity metric quantifies a semantic similarity of the first term and the second term.

A mapping operation 408 maps, based on the computed similarity metrics, each term of the first ontology to a corresponding term of the second ontology. A receiving operation 410 receives as input a term of the first ontology and an ontology translation operation uses the generated mapping to identify and return a most-semantically similarity term from the second ontology.

Figure 5:
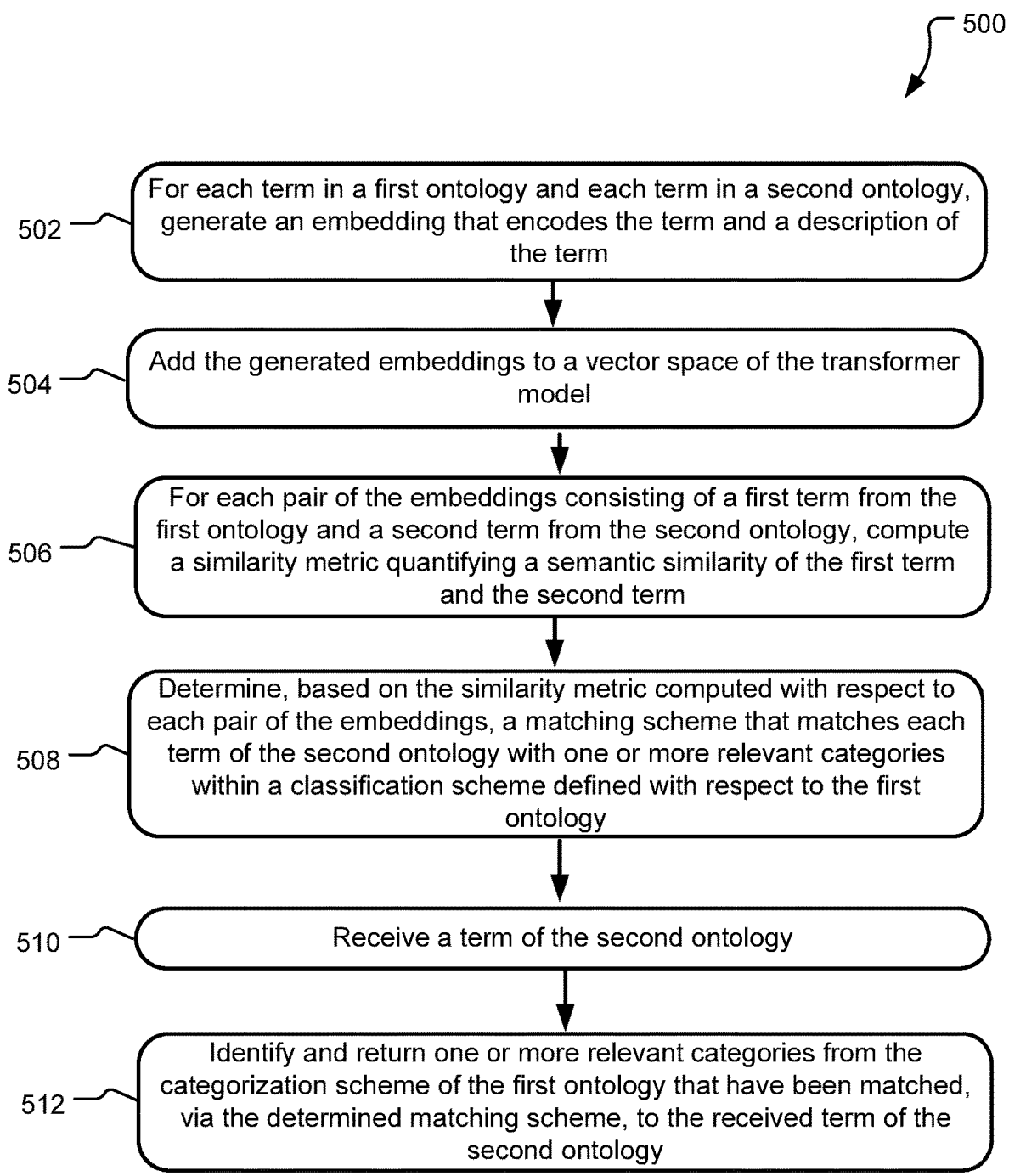
FIG. 5 illustrates additional example operations for ontology matching that provide for automatically classifying terms of a second ontology into categories of a categorization scheme defined with respect to a first ontology.

FIG. 5 illustrates additional example operations 500 for ontology matching that provide for automatically classifying terms of a second ontology into categories of a categorization scheme defined with respect to a first ontology (e.g., previously used to categorize terms of a first ontology). An embedding generation operation 502 generates (e.g., by an encoder) an embedding for each term in a first ontology and each term in a second ontology, where each of the generated embeddings encodes both a term and a textual description of the term. In one implementation, the embedding generation operation 502 provides for identifying a subset of terms of the first ontology and/or the second ontology that are not yet represented in a vector space of a transformer model. If, for example, the vector space of the model already includes embeddings corresponding to all terms of the first ontology, the embedding generation operation entails generating embeddings for the terms of the second ontology.

A model update operation 504 adds the generated embeddings to the vector space of the transformer model wherein distances between pairs of embeddings correlates with similarity of the associated embedded terms. A similarity metric computation operation 506 computes a similarity metric for each pair of the embeddings within the vector space, where each pair includes a first term from the first ontology and a second term from the second ontology. The similarity metric quantifies a semantic similarity between the terms of the pair and may, in some implementations, be computed by taking a cosine similarity or a dot product of two embeddings in the pair. Following the model update operation 504, it is assumed that the NLP model includes an embedding corresponding to each term of the first ontology and each term of the second ontology.

A determination operation 508 determines, based on the computed similarity metrics, a matching scheme that matches each term of the second ontology to one or more relevant categories of the classification scheme defined with respect to the first ontology. In one implementation, the matching scheme is a stable matching scheme identified by employing a suitable matching optimization algorithm, such as the stable marriage algorithm. A receiving operation 510 receives as input a term from the second ontology, and an ontology translation operation 512 identifies and returns one or more relevant categories from the categorization scheme defined with respect to the first ontology that have been matched, via the determined matching scheme, to the received term of the second ontology.

Figure 6:
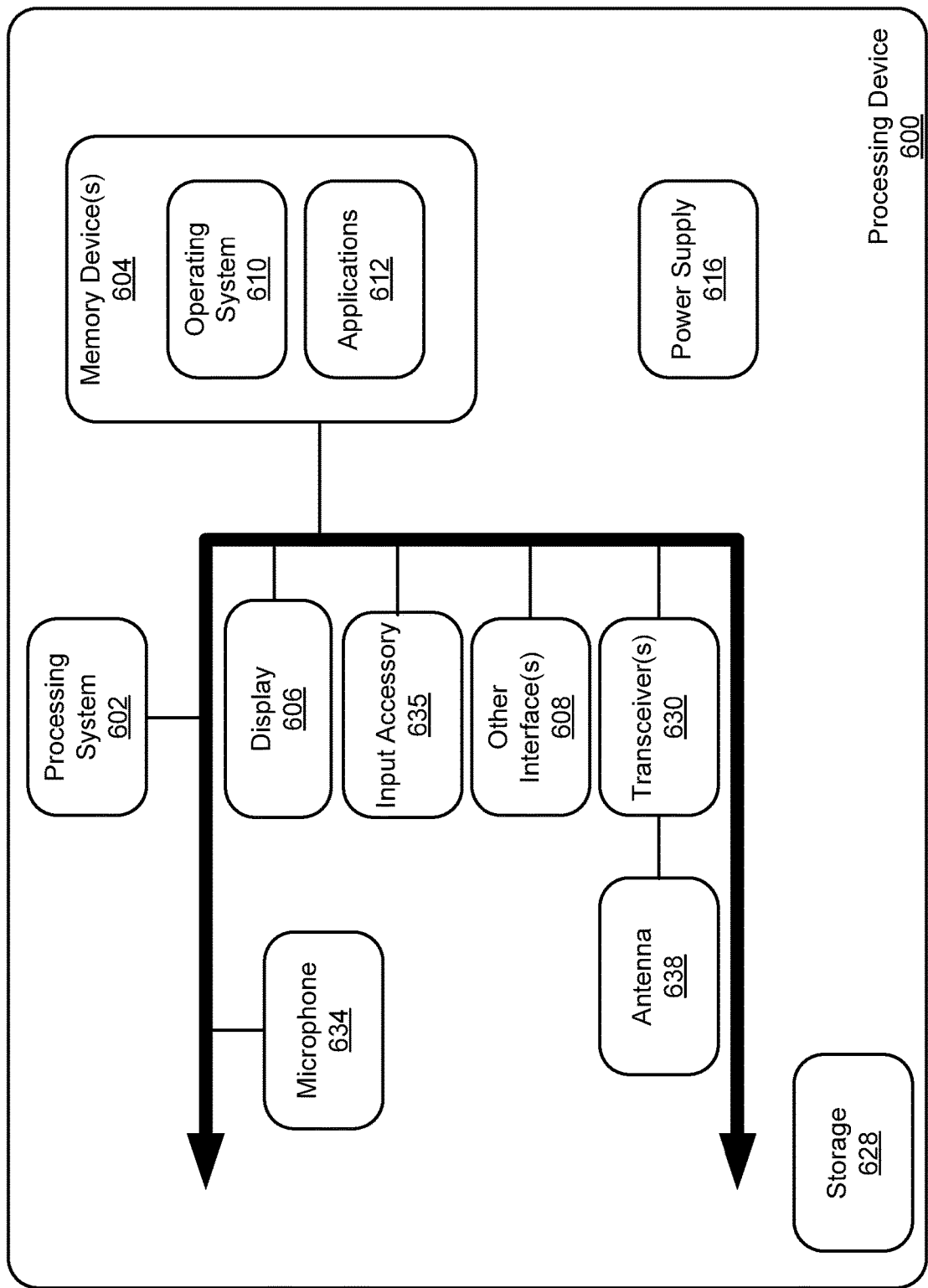
FIG. 6 illustrates an example schematic of a processing device suitable for implementing aspects of the disclosed technology.

FIG. 6 illustrates an example schematic of a processing device 600 suitable for implementing aspects of the disclosed technology. The processing device 600 includes a processing system 602, memory device(s) 604, a display 606, and other interfaces 608 (e.g., buttons). The processing system 602 includes one or more processors (CPUs, GPUs, etc.).

The memory 604 generally includes both volatile memory (e.g., RAM) and non-volatile memory (e.g., flash memory). An operating system 610 may reside in the memory 604 and be executed by the processing system 602. A NLP model may also be stored in the memory 604 or in distributed memory of multiple different storage devices.

One or more applications 612 (e.g., the metadata generation engine 102, the ontology translation engine 110, the indexing engine 116, the encoded 202, the transformer model 204, the similarity determination engine 206, or the stable match identifier 216) are loaded in the memory 604 and executed on the operating system 610 by the processing system 602. The applications 612 may receive inputs from one another as well as from various input local devices such as a microphone 634, and an input accessory 635 (e.g., keypad, mouse, stylus, touchpad, gamepad, joystick).

Additionally, the applications 612 may receive input from one or more remote devices, such as remotely-located smart devices, by communicating with such devices over a wired or wireless network using more communication transceivers 630 and an antenna 638 to provide network connectivity (e.g., a mobile phone network, Wi-Fi®, Bluetooth®). The processing device 600 may also include one or more storage devices 628 (e.g., non-volatile storage). Other configurations may also be employed.

The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared, and other wireless media.

(A1) An example processor-implemented method disclosed herein provides for automatically classifying terms of a first ontology into categories of a classification scheme defined with respect to a second ontology. The method provides for generating, for each term in the first ontology and each term in the second ontology, an embedding encoding the term and a description of the term, and for adding the generated embeddings to a transformer model. For each pair of the embeddings consisting of a first term from the first ontology and a second term from the second ontology, a similarity metric is computed. The similarity metric quantifies a similarity of the first term and the second term. The method further provides for determining a matching scheme with respect to each pair of the embeddings based on the associated similarity metric. The matching scheme matches each term of the first ontology to one or more relevant categories of the classification scheme defined with respect to the second ontology. Responsive to receiving as input a term of the first ontology, the method further provides for returning one or more relevant categories of the classification scheme that are matched, by the determined matching scheme, to the term. The method of A1 is advantageous because it allows for objective and automatic (processor-implemented, without manual effort) translation of each term in a first ontology to a corresponding "best match" term in a second ontology. This tool may facilitate low-effort modification of a variety of existing NLP tools to facilitate applications of those tools that may depend upon an ontology different that is different than the ontology for which the tool(s) were initially designed to utilize. For example, this tool may facilitate translation of descriptive metadata generated for digital content of a source ontology to an alternate ontology and for categorizing the translated terms of the alternate ontology to thereby generate even richer (e.g., more searchable) descriptive metadata without modifying the underlying code platforms used to originally generate the descriptive terms of the source ontology.

(A2) In still another implementation of A1, determining the matching scheme further comprises constructing a graph that includes a first set of nodes corresponding to the terms of the first ontology, a second set of nodes corresponding to the terms of the second ontology (e.g., the terms previously classified per the classification scheme), and a third set of nodes corresponding to the categories of the classification scheme. The graph further includes a first set of edges linking the first set of nodes to the second set of nodes, and each edge in the first set of edges is characterized by an edge weight based on the similarity metric computed with respect to endpoints of the edge. The graph still further includes a second set of edges linking the second set of nodes (e.g., terms of the first ontology) to the third set of nodes (e.g., the categories) such that there exist a number of paths extending from the first set of nodes (e.g., terms of the first ontology) to the third set of nodes. Each path of the number of paths incorporates an edge selected from the first set of edges and an edge selected from the second set of edges. The method of A2 is advantageous because it facilitates a mapping between the terms of the first ontology and the categories used to classify the terms of the second ontology.

(A3) In still another implementation of any of the methods A1-A2, determining the matching scheme further comprise assigning each path of the number of paths a path weight based on the similarity metric computed with respect to an edge of the first set of edges that is within the path. The method further provides for modifying the graph to merge select paths that extend between common endpoints and to adjust the path weight associated with each of the merged paths. The determined matching scheme is computed based on the path weights of the modified graph.

(A4) In still another implementation of any of the methods A1-A3, the method further comprises determining, based on the modified graph, a stable matching scheme linking each term of the first ontology with a best match category of the categories, the determined matching scheme being the stable matching scheme. The stable matching scheme ensures that each term of the first ontology is matched to its single most similar term of the second ontology while simultaneously ensuring that there are no pairs of nodes more similar to one another than to their respective matched partner nodes and no node that is more similar to an unmatched node that to its own matched node.

(A5) In still another implementation of any of the methods A1-A4, the method further comprises using the similarity metric computed between a first term of the first ontology and of a second term of the second ontology to quantify a strength of association between the first term of the first ontology and one or more categories of the classification scheme defined with respect to the second ontology. This advantageously provides for automatic, objective comparison of the similarity of pairs of terms.

(A6) In still another implementation of any of the methods A1-A5, determining the matching scheme further comprises executing a stable marriage algorithm with respect to the number of paths connecting each of the categories to one or more of the terms of the first ontology.

(A7) In still another implementation of any of the methods A1-A6, the term received as input of the first ontology is associated with digital content and wherein the method further comprises adding the one or more relevant categories to metadata that is used to index the digital content. This allows for classifying terms of the second ontology per a pre-existing classification scheme defined with respect to another ontology without manual effort and without relying on subjective human input.

(A8) In still another implementation of any of the methods A1-A7, the transformer model is a Bidirectional Encoder Representations from Transformers (BERT) model.

In another aspect, some implementations include a computing system for mapping terms of a first ontology to a second ontology and/or for automatically classifying terms of the first ontology into categories of a classification scheme defined with respect to the second ontology. The computing system includes hardware logic circuitry that is configured to perform any of the methods described herein (e.g., methods A1-A7).

In yet another aspect, some implementations include a computer-readable storage medium for storing computer-readable instructions. The computer-readable instructions, when executed by one or more hardware processors, perform any of the methods described herein (e.g., methods A1-A7).

Some implementations may comprise an article of manufacture. An article of manufacture may comprise a tangible storage medium (a memory device) to store logic. Examples of a storage medium include one or more types of processor-readable storage media capable of storing electronic data, including volatile memory or non-volatile memory, removable or non-removable memory, erasable or non-erasable memory, writeable or re-writeable memory, and so forth. Examples of the logic include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture stores executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A processor-implemented method, comprising:
generating an embedding encoding each term of a plurality of terms and a corresponding description, the plurality of terms comprising terms from a first ontology and terms from a second ontology;
adding the embeddings to a transformer model;
generating a plurality of pairs of the embeddings, each pair of the plurality of pairs comprising a first term from the first ontology and a second term from the second ontology;
computing a similarity metric quantifying a similarity of the first term and the second term for each pair of the plurality of pairs;
determining, based on the similarity metric, a stable matching scheme that matches each term of the first ontology to a single best match category of a classification scheme defined with respect to the second ontology; and responsive to receiving as input a particular term of the first ontology, returning a corresponding best match category of the classification scheme based on a match, by the stable matching scheme, to the particular term.

2. The processor-implemented method of claim 1, wherein determining the stable matching scheme further comprises:
constructing a graph that includes:
a first set of nodes corresponding to terms of the first ontology, a second set of nodes corresponding to terms of the second ontology, and a third set of nodes corresponding to categories of the classification scheme;
a first set of edges linking the first set of nodes to the second set of nodes, each edge in the first set of edges having an edge weight based on the similarity metric computed with respect to endpoints of the edge; and
a second set of edges linking the second set of nodes to the third set of nodes such that paths extend between the first set of nodes and the third set of nodes, each path of the paths incorporating an edge selected from the first set of edges and an edge selected from the second set of edges.

3. The processor-implemented method of claim 2, wherein determining the stable matching scheme further comprises:
assigning each path of the paths a path weight based on the edge weight of a particular edge of the first set of edges that is within the path; and
producing a modified graph by generating merged paths by merging select paths that extend between common endpoints and assigning a merged path weight to the merged paths;
wherein the stable matching scheme is determined based on the merged path weights of the modified graph.

4. The processor-implemented method of claim 3, wherein determining the stable matching scheme is based on the modified graph.

5. The processor-implemented method of claim 1, further comprising:
using the similarity metric computed between a first term of the first ontology and of a second term of the second ontology to quantify a strength of association between the first term of the first ontology and one or more categories of the classification scheme defined with respect to the second ontology.

6. The processor-implemented method of claim 2, wherein determining the matching scheme further comprises executing a stable marriage algorithm or a Hungarian matching algorithm with respect to the paths connecting each of the categories of the classification scheme to one or more of the terms of the first ontology.

7. The processor-implemented method of claim 1, wherein the particular term received as input of the first ontology is associated with digital content and wherein the method further comprises adding the particular relevant category to metadata that is used to index the digital content.

8. The processor-implemented method of claim 1, wherein the transformer model is a Bidirectional Encoder Representations from Transformers (BERT) model.

9. A system for ontology matching, comprising:
memory;
a processing system;
an encoder stored in the memory and executable by the processing system to generate a plurality of embeddings that correspond to terms of a first ontology or a second ontology, each embedding of the plurality of embeddings encoding a term and a description of the term;
a transformer model stored in the memory and executable by the processing system to add the plurality of embeddings to a vector space in which similarity between terms is correlated with distance between respective pairs of the embeddings;
a similarity determination engine stored in the memory and executable by the processing system to compute a similarity metric for each of the respective pairs of the embeddings that comprise a first term from the first ontology and a second term from the second ontology, the similarity metric quantifying a semantic similarity of the first term and the second term; and
a stable match identifier stored in the memory and executable by the processing system to determine, based on the similarity metric computed with respect to each pair of the embeddings, a stable matching scheme that matches each term of the second ontology to a single best match category of a classification scheme used to classify the terms of the first ontology; and
an ontology translation engine stored in memory and configured to:
receive as input a particular term of the second ontology; and
utilize the stable matching scheme to identify and return a particular relevant category classifying the particular term, the particular relevant category being selected from categories of the classification scheme.

10. The system of claim 9, wherein the similarity determination engine is further executable to construct a graph that includes:
a first set of nodes corresponding to the terms of the first ontology, a second set of nodes corresponding to the terms of the second ontology, and a third set of nodes corresponding to categories of the classification scheme;
a first set of edges linking the first set of nodes to the second set of nodes, each edge in the first set of edges having an edge weight based on the similarity metric computed with respect to endpoints of the edge; and
a second set of edges linking the first set of nodes to third set of nodes such that there exist a number of paths extending between the first set of nodes and the third set of nodes, each of the number of paths incorporating an edge selected from the first set of edges and an edge selected from the second set of edges.

11. The system of claim 10, wherein the stable match identifier is further executable to:
assign each path of the number of paths a path weight based on the edge weight of a particular edge of the first set of edges that is within the path; and
produce a modified graph by generating merged paths by merging select paths that extend between common endpoints and assigning a merged path weight to the merged paths;
wherein the stable matching scheme is computed based on the path weights of the modified graph.

12. The system of claim 10, wherein the stable match identifier executes a stable marriage algorithm or a Hungarian matching algorithm with respect to the number of paths connecting each of the categories of the classification scheme to one or more of the terms of the second ontology.

13. The system of claim 9, wherein the particular term of the second ontology is associated with digital content and wherein the system further includes an indexing engine stored in memory that is executable to add the particular relevant category to metadata that is used to index the digital content.

14. The system of claim 9, wherein the transformer model is a Bidirectional Encoder Representations from Transformers (BERT) model.

15. A tangible computer-readable storage media encoding computer-executable instructions for executing a computer process for ontology matching between a first ontology and a second ontology, the computer process comprising:

adding to a transformer model a plurality of embeddings that correspond to terms of at least one of the first ontology and the second ontology, each of the embeddings encoding a term and a description of the term and being represented within a vector space of the transformer model in which similarity between terms is correlated with distance between corresponding pairs of the embeddings;

computing a similarity metric quantifying a similarity of each pair of the plurality of embeddings that consists of a first embedding corresponding to a first term from the first ontology and a second embedding corresponding to a second term from the second ontology;

mapping, based on the similarity metric, each term of the first ontology to a most semantically similar term of the second ontology;

executing a stable matching algorithm to identify a stable matching scheme that matches each term of the first ontology with a corresponding best match term of the second ontology; and responsive to receiving as input a particular term of the first ontology, returning the most semantically similar term of the second ontology.

16. The tangible computer-readable storage media of claim 15, wherein the stable matching algorithm includes at least one of a stable marriage algorithm or a Hungarian matching algorithm.

17. The tangible computer-readable storage media of claim 15, wherein the computer process further comprises mapping, based on the computed similarity metric for each pair of the plurality of embeddings, each term of the second ontology to one or more categories within a categorization scheme used to classify terms of the first ontology.

18. The tangible computer-readable storage media of claim 15, wherein the particular term received as input from the second ontology is associated with digital content and wherein the computer process further comprises:

adding the returned most semantically similar term to metadata that is used to index the digital content.

19. The tangible computer-readable storage media of claim 15, wherein the transformer model is a Bidirectional Encoder Representations from Transformers (BERT) model.

20. The tangible computer-readable storage media of claim 15, wherein computing the similarity metric includes computing a cosine similarity.

* * * * *